May 5, 1936. L. H. GILLETTE 2,039,403
AUTOMOBILE VENTILATION
Filed Oct. 6, 1933 2 Sheets-Sheet 1
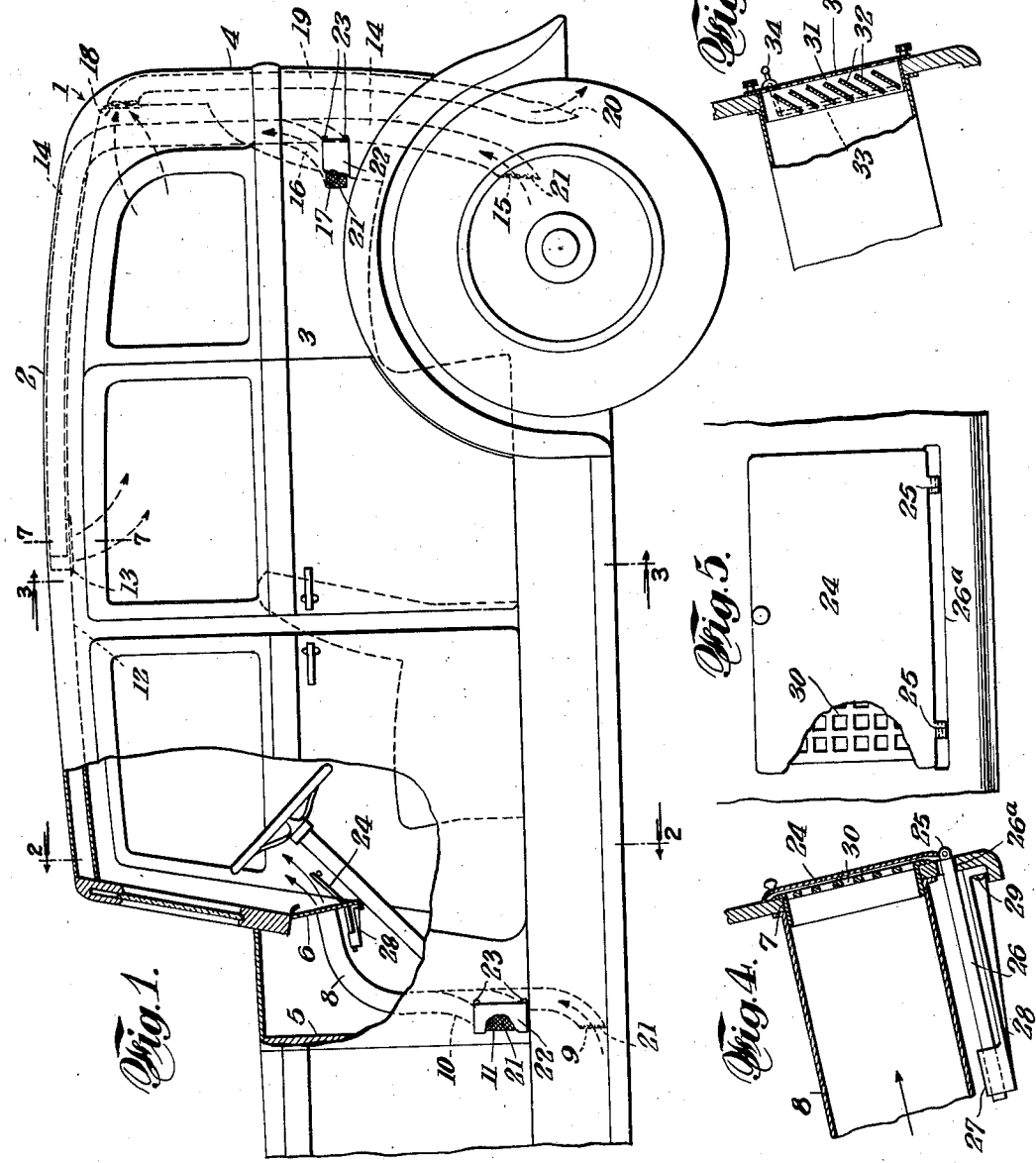

May 5, 1936.  L. H. GILLETTE  2,039,403
AUTOMOBILE VENTILATION
Filed Oct. 6, 1933   2 Sheets-Sheet 2
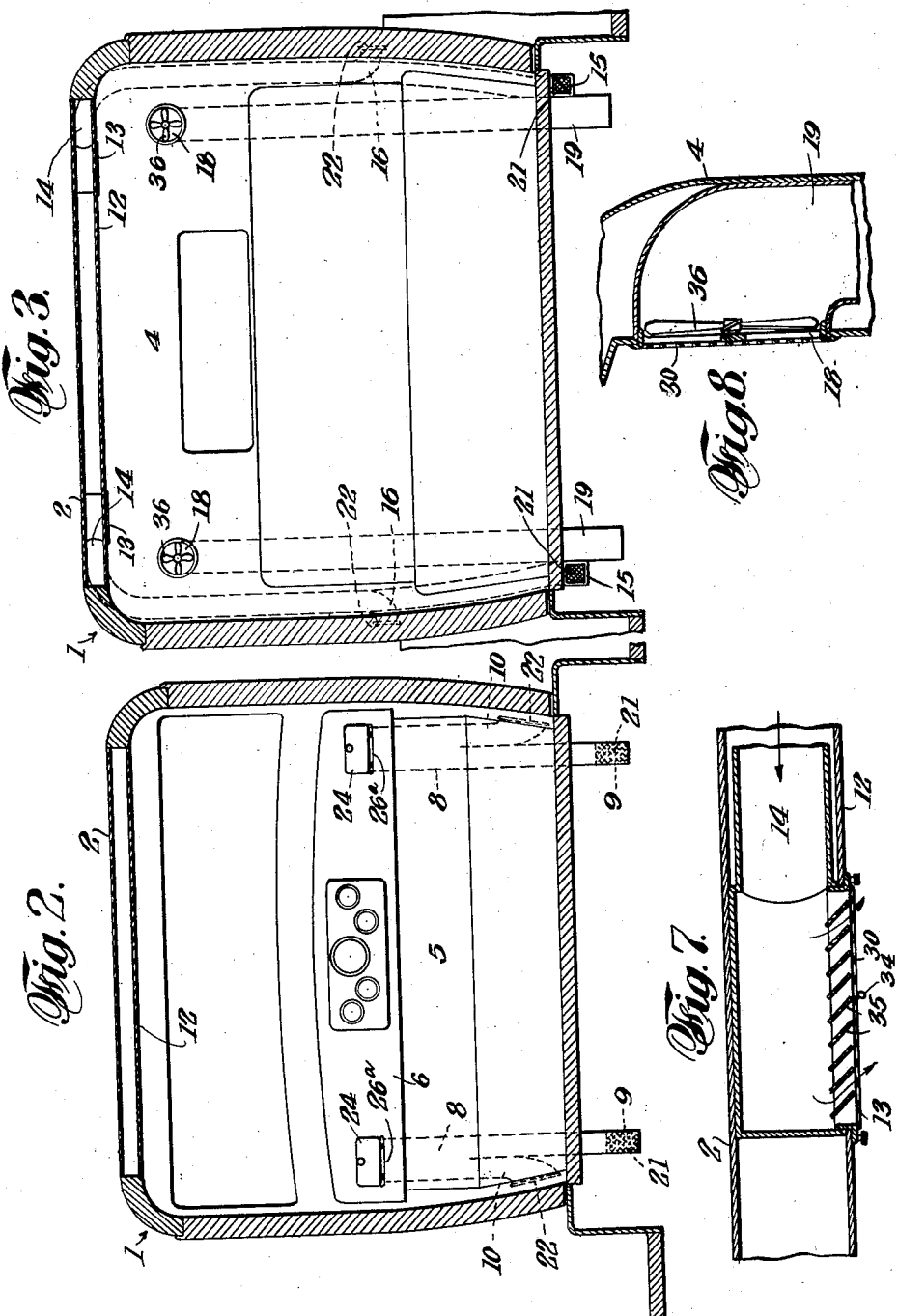
INVENTOR
Lillian H. Gillette
BY
Benjamin Inman
ATTORNEY Patented May 5, 1936

2,039,403

UNITED STATES PATENT OFFICE 2,039,403

AUTOMOBILE VENTILATION

Lillian H. Gillette, Ossining, N. Y.

Application October 6, 1933, Serial No. 692,459

6 Claims. (Cl. 98—2)

This invention relates to automobile body ventilation, and its principal object is to provide an automobile having efficient and improved means for this purpose, wherewith controlled currents of ample air may be continually drawn into the body, circulated therein, and withdrawn therefrom effectively, without creating any drafts or necessitating the opening of any window or windshield.

Other objects and advantages will hereinafter appear.

In the accompanying drawings,—

Fig. 1 is a side elevation, partly in cross-section, showing an automobile body equipped with the ventilation of this invention.

Figs. 2 and 3 are respectively transverse-sectional front and rear elevations of the automobile body shown in Fig. 1.

Fig 4 is a longitudinal cross-sectional elevation, in an enlarged scale, of a portion of the panel 6 in Fig. 1.

Fig. 5 is a front elevation, partially broken away, of the panel portion shown in Fig. 4.

Fig. 6 is a view similar to Fig. 4, but showing a modification of the instrument panel construction.

Fig. 7 is a longitudinal cross-sectional elevation, in an enlarged scale, showing the region of one of the air exits 13 of Fig. 3.

Fig. 8 is a longitudinal cross-sectional elevation, in an enlarged scale, showing the region of one of the air inlets 18 of Figs. 1, 3.

The automobile body 1 comprises a usual top 2, side-walls 3, a rear wall 4, a dash-board 5, and an instrument panel 6. Said panel is provided with a pair of openings 7, which constitute exits for air conveying ducts 8 that extend therefrom forwardly and downwardly to a point below the chassis, whereat they are provided with openings 9 that face the front of the car. Branching ducts 10 project from the vertical ducts 8 to the sides 3 of the car, where they terminate in air inlet openings 11. The ceiling 12, Figs. 1, 7, is provided with openings 13, which constitute exits for two air conveying ducts 14, that are located between said ceiling and the top 2 and extend laterally toward the rear of the body, whereat they bend and project vertically downwardly to a point below the chassis, terminating in air inlet openings 15 that face the front of the car. Branching ducts 16 project from the vertical ducts 14 to the sides 3 of the car, where they terminate in air inlet openings 17. In the interior side of the rear wall 4 of the body are located circular openings 18, which constitute inlets for air conveying ducts 19 that extend therefrom downwardly to a place below the chassis, whereat they terminate in exit openings 20 that face the rear of the car. The air inlet openings 9, 11, 15, 17 are provided with gratings 21 to prevent ingress of solid matter into the ducts, and the grated openings 11, 17 are equipped with doors 22 that are hinged at 23 and are capable of opening only partially or obliquely to the body walls, said doors being here shown as partially broken away to disclose the gratings 21.

The air outlets 7 in panel 6 are provided with shutters 24 that are hinged frictionally at 25 to rods 26 which protrude through a slotted opening 26ª in the panel and are slidable in guiding sockets 27 forming part of brackets 28 secured to the rear of said panel at 29, whereby the shutter 24 may be adjusted from the closed position shown in Fig. 4 to any angular position illustrated in Fig. 1. When the shutter 24 is fully open it may be placed completely out of the way by inserting it into the slot 26ª and sliding it fully thereinto, guided by the rods 26 and sockets 27. The exit 7 is preferably provided with a grating 30 as shown in Figs. 4, 5. In the modification shown in Fig. 6, the grating 30 and shutter 24 are substituted by a register 31 similar to that utilized for household hot-air duct exits, consisting of a series of pivoted slats 32 pivotally geared to a common link 33 hinged to a controlling lever 34, by which means the extent of entry of air into the body may be regulated. In a similar manner the air supply exit 13 of the ceiling 12 is equipped with a register 35, by means of which the amount as well as the direction of the current of the entering air may be regulated by the occupants of the car, as shown in Fig. 1. In each circular opening 18 leading to duct 19 is located a pivotally mounted, free running, fan 36.

As the car is in motion, the air is driven into the grated inlet opening 9 and rises in the duct 8, while simultaneously the air, striking the angularly opened door 22, is thereby impinged and forced into the grated inlet opening 11 of branched duct 10. The two air currents are then injected upwardly through the duct 8 and outwardly through the exit 7, wherefrom the air floods the forward section of the interior of the body. In a similar manner the air is forced into the inlet openings 15, 17, and ascending to the ceiling of the body through the ducts 14 is emitted from the exits 13 to flood the rear section of the body. The streams of air issuing from the exits 7, 13, on meeting each other, tend to cause thorough and continual circulation of the air throughout all parts of the body. The movement of the car causes the befouled air to be drawn into the inlet openings 18, through the ducts 19, and outwardly from the exits 20. As the air passes through the openings 18 the current causes the fans 36 to be rotated, and in this manner any undue draft through the body is prevented. The fans 36 have the effect of impeding or eliminating the draft which would otherwise be caused by the air emanating from the instrument panel 6 and flowing directly toward the inlets 18. Said fans also cause the incoming air to first fill the entire body and then make its way outwardly through the inlets 18, without however producing any draft. Should any circumstances tend to produce discomfort through an undue intake of air through the exits 7, 13, the passengers may readily control the currents of incoming air by regulating the registers 31, 35 or the degree of opening of the doors 24. By the same means the passengers may likewise control the direction of the current of incoming air.

It will be evident that with this automobile ventilation fresh air will be at all times drawn into the body while all foul air will be simultaneously expelled, and that this process will continue without causing any draft or discomfort to the passengers. As this ventilation requires no dependence on open windows or windshield, the latter may be all closed while the ventilation is continuing efficiently. Under such conditions, which may occur during cold or moist weather, the ventilation will keep the window panes fully clear of vapor and unobscured. With this ventilation, also, all intake and expelling of air may be accomplished without requiring any openings in the exterior of the top or rear of the body. Several other vital advantages inherent to these improvements will be evident to those versed in this art. Suitable air purifiers may be located in requisite places to cleanse the air before its passage through the exits 7, 13.

Variations may be resorted to within the scope of the invention, and portions of the improvements may be used without others.

Having thus described my invention, I claim:—

1. An automobile having its body provided with an interior ceiling and walls, said ceiling having an exit, an exterior top and walls, a duct located between said ceiling and top extending rearwardly from said exit, said duct turning at the rear of the body and extending between said interior and exterior walls downwardly to the bottom of the body, the terminal of said duct at the bottom of the body having an opening located beneath and facing the front of the body, and the air entering said opening while the automobile is in motion being conducted toward and entering the body through said exit.

2. In an automobile having a body, means operated by the motion of the automobile to draw air from beneath the bottom of the automobile convey it to and inject it into the front of the body, means operated by the motion of the automobile to draw air from beneath the bottom of the automobile convey it to and inject it into the body through the top, and means operated by the motion of the automobile to withdraw the air from the body convey it to and eject it outside of the body at the bottom of the automobile.

3. In an automobile having a body, means operated by the motion of the automobile to draw air from beneath the bottom of the automobile convey it to and inject it through the top into the body, and means operated by the motion of the automobile to withdraw the air from the body convey it to and eject it outside of the body through the bottom of the automobile.

4. An automoboile having its body provided with an interior ceiling and walls, said ceiling having an exit, an exterior top and walls, a duct located between said ceiling and top extending rearwardly from said exit, said duct extending between said interior and exterior walls to the bottom of the body, the terminal of said duct at the bottom of the body having an opening located beneath and facing the front of the body, the air entering said opening being conducted toward and entering the body through said exit, said duct having a branch extending therefrom and passing through the side of the body, and the terminal of said branch at the side of the body having an opening for receiving and feeding additional air into said duct.

5. An automobile having its body provided with a front exit, a duct extending from said exit downwardly to the bottom of the body, the terminal of said duct at the bottom of the body having an opening located beneath and facing the front of the body, the air entering said opening while the automobile is in motion being conducted toward and entering the body through said exit, said duct having a branch extending therefrom and passing through the side of the body, and the terminal of said branch at the side of the body having an opening for receiving and feeding additional air into said duct.

6. An automobile having its body provided with an interior ceiling and walls, said ceiling having an exit, an exterior top and walls, a duct located between said ceiling and top extending rearwardly from said exit, said duct extending between said interior and exterior walls downwardly to the side of the body and terminating as an opening in the exterior of said side, and the air entering said opening while the body is in motion being conducted to said exit.

LILLIAN H. GILLETTE.